United States Patent [19]

Nitta

[11] Patent Number: 5,016,439
[45] Date of Patent: May 21, 1991

[54] EXHAUST SYSTEM FOR A SMALL WATERCRAFT ENGINE

[75] Inventor: Shigemitsu Nitta, Kakogawa, Japan

[73] Assignee: Kawasaki Jukogyo Kabushiki Kaisha, Kobe, Japan

[21] Appl. No.: 417,750

[22] Filed: Oct. 5, 1989

[30] Foreign Application Priority Data

Oct. 8, 1988 [JP] Japan .................... 63-131990
Oct. 8, 1988 [JP] Japan .................... 63-131992
Jan. 5, 1989 [JP] Japan ...................... 1-58021

[51] Int. Cl.⁵ ............................................. F01N 3/04
[52] U.S. Cl. ........................................ 60/310; 60/322; 440/89
[58] Field of Search .................... 60/310, 322; 440/89

[56] References Cited

U.S. PATENT DOCUMENTS

| | | | |
|---|---|---|---|
| 4,019,456 | 4/1977 | Harbert | 440/89 |
| 4,074,525 | 2/1978 | LeSalver | 60/322 |
| 4,194,460 | 3/1980 | Sato . | |
| 4,512,148 | 4/1985 | Jacobson . | |
| 4,685,292 | 8/1987 | Brigham . | |
| 4,693,079 | 9/1987 | Wuensche . | |
| 4,773,883 | 9/1988 | Nakase | 60/322 |

FOREIGN PATENT DOCUMENTS

| | | | |
|---|---|---|---|
| 2803270 | 8/1979 | Fed. Rep. of Germany | 60/322 |
| 157994 | 8/1985 | Japan | 440/89 |
| 287897 | 12/1986 | Japan | 440/89 |

Primary Examiner—Douglas Hart

[57] ABSTRACT

An engine exhaust system for a small watercraft. The engine is fixed to a hull through a damper, while an expansion chamber is fixed directly to the hull. An exhaust port of the engine and an inlet of expansion chamber are connected by an exhaust pipe, and the inlet of expansion chamber and an outlet of exhaust pipe are connected by a fitting with thermal durability and flexibility. In the case where the expansion chamber is followed by a muffler, at least a latter half of the expansion chamber is inserted into the muffler.

5 Claims, 13 Drawing Sheets

41

42

43

44

45

46

FIG.19A PRIOR ART
FIG.19B PRIOR ART
FIG.19C PRIOR ART
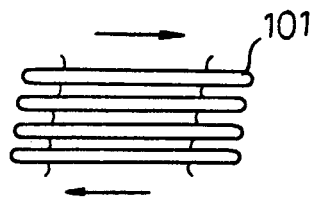
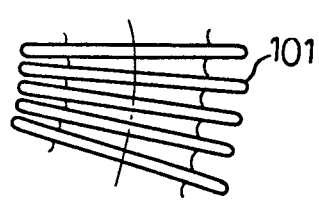
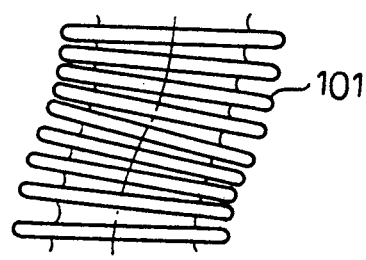
FIG.20 PRIOR ART
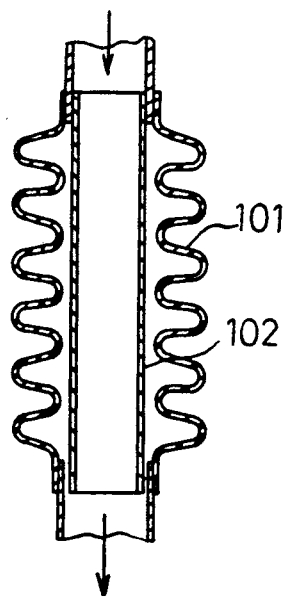
FIG.21 PRIOR ART
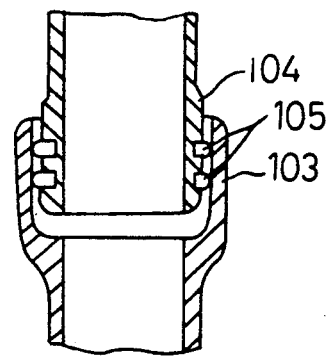
FIG.22 PRIOR ART
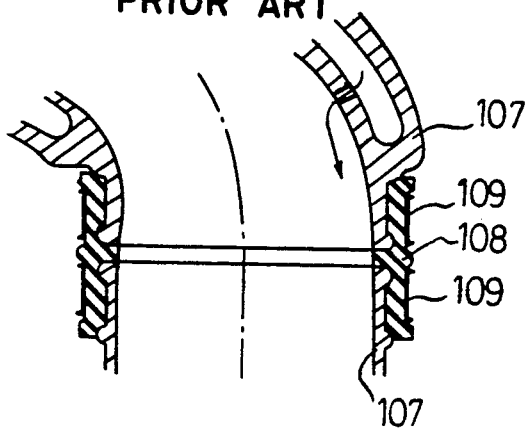

EXHAUST SYSTEM FOR A SMALL WATERCRAFT ENGINE

FIELD OF THE INVENTION AND RELATED ART STATEMENT

This invention relates to an engine exhaust system for a small watercraft of waterjet propulsion type or screw propulsion type.

In a small watercraft, generally a small-size lightweight engine is used to reduce a loading space occupied by engine and an engine weight on board. In this case, a lack in capability of the small-size light-weight engine is often covered by an expansion chamber serving to enhance air charging efficiency of engine taking advantage of pulsating wave of exhaust gas.

In this connection, as shown in FIGS. 16 and 17, heretofore, the expansion chamber 15' in the prior art has been installed integrally with the engine 10' on its one upper side as disclosed in U.S. Pat. No. 4,194,460, U.S. Ser. No. 914,949 (Filing date 10/03/'86).

The engine expansion chamber in the prior art as described above is cast normally with aluminum alloy or other metals. Because the engine expansion chamber 15' has a large volume and weight, and is installed at an elevated place of the engine 10', the center of gravity of the overall engine 10' becomes high, thus leading to a high center of gravity of a hull, when the engine 10' is installed on the hull. On the other hand, a considerably large width of the expansion chamber 15' extends out toward a side of the engine 10' when the expansion chamber 15' is installed on the engine 10', thus requiring a large width of engine room to accomodate the engine 10'. Further, the muffler installed next to the exhaust chamber is normally fixed to the hull independently of the engine 10', while the engine 10' is installed on the hull through a damper to prevent engine vibration from being transmitted to the hull. Therefore, a pipe 51 connecting the expansion chamber and the muffler is needed, for which a relatively long and flexible rubber tube 51 (See FIG. 17) has been normally used to absorb relative dislocation of the expansion chamber and the muffler due to engine vibration. However, such a pipe 51 connected to the outlet of the expansion chamber 15' increases pipe resistance (back pressure), thus causing a possible power reduction of engine 10'.

Furthermore, the heat proof temperature of the rubber tube (in the order of 120 degrees C. for synthetic rubber) is considerably lower than exhaust gas temperature (500 to 700 degrees C.), therefore requiring cooling of the tube by passing cooling water for the engine 10' through the connecting tube 51. The cooling water passed through the connecting tube 51 is introduced into the muffler, and then discharged outboard along with exhaust gas.

With the engine exhaust system according to the prior art as described above, cooling water from the engine 10' is always present in the vicinity of the outlet of the expansion chamber 15' and in the passage of exhaust gas in the expansion chamber 15'. As a result, if a small watercraft should be, for example, overturned, and the elevation of the expansion chamber 15' becomes higher than the exhaust port of the engine 10', cooling water in the vicinity of or in the outlet of the expansion chamber 15' may enter the engine 10'.

In connection with this problems, the laid-open Japanese patent application No. 63-71497 has disclosed that a wall surface of the expansion chamber extends upright at the outlet thereof or a portion from which cooling water is introduced into the connecting pipe. But, since the connection pipe through which cooling water passes and the outlet of the expansion chamber are communicated with each other, should a small watercraft be overturned, the system may have a possibility of cooling water passing through the exhaust gas passage in the expansion chamber to enter the engine. Further, the laid-open Japanese patent application No. 62-35013 disclosed that the inlet side of the outlet pipe which discharges exhaust gas outboard from the second expansion chamber is lowered to the bottom of the expansion chamber or than the outlet of the connection pipe, to prevent standing cooling water in the expansion chamber from entering the connection pipe. But, similarly to the laid-open Japanese patent application No. 63-71497, since the connection pipe through which cooling water passes and the outlet of the expansion chamber are communicated with each other, should a small watercraft be overturned, the system may also have a possibility of cooling water passing through the exhaust gas passage in the expansion chamber to enter the engine.

Further, to overcome the above described defects of rubber tube, some exhaust ports of engine are connected to a muffler or other exhaust system via rigid exhaust pipe made of metal or expansion chamber.

In this connection, it is necessary to prevent exhaust gas from leaking out of portions where the exhaust system is connected to the exhaust pipe, as well as to absorb vibration from the engine at the connection portions to avoid the transmission of vibration to the successive exhaust system.

Heretofore, the following fitting devices for exhaust pipe in the prior art have been used as practicable to meet the above described requirements: -1- Flexible metal tube (FIGS. 19A, 19B, 19C) which is formed from thin sheet metal into bellows; -2- Flexible metal tube (FIG. 20) into which a smaller diameter inner tube 102 is inserted with radial spacing; -3- Pipe fitting (FIG. 21) in which one pipe is expanded at one end thereof, and the other pipe 104 is inserted into the expanded end 103. Seal rings 105 are provided between the inner circumferential surface of the expanded portion 103 and the outer circumferential surface of the pipe 104; -4- One pipe 106 and the other pipe 107 are disposed with a gap in line. A connection sleeve 108 of heat resisting rubber is fixed to both pipes 106 and 107 with a tightening ring 109 so as to cover both ends of them. Cooling water is passed through the connection sleeve 108 to cool it (FIG. 22).

The above metal tube 101 in -1- can dislocate to a large degree in a longitudinal direction but quite small in a lateral direction (See FIG. 19A). As a result, to absorb a sufficient lateral dislocation at the connection portion, the metal tube 101 must be long (FIG. 19C). For this reason, the connection portion becomes longer. Accordingly, a relatively large space or long distance is necessary. Further, since the inside of the metal tube 101 is exposed to high temperature exhaust gas, the metal tube 101 easily deteriorates, thus resulting in a relatively short service life. Furthermore, the connection of the end portion of the metal tube 101 to an exhaust pipe requires complicated machining of the end portion of the metal tube 101 into a flange form or additional provision of seal members for prevention of gas leakage, thus resulting in expensive costs. Pipe fitting device in -2- which has inner tube 102 can prevent the high temperature exhaust gas from being in direct contact with the metal tube 101, but has only a limited lateral dislocation due to interference of the inner tube 102 even with a longer metal tube 101. Further, similarly to the case in -1-, connection of the metal tube 101 to exhaust pipe requires complicated machining and additional provision of seal members, thus resulting in high costs; Pipe fitting device in -3- cannot dislocate much in a lateral direction because it depends only on the dislocation of the seal rings 105, and besides since the seal rings 105 cannot always seal exhaust gas completely, gas may leak out of the pipe fitting; Pipe fitting device in -4- can serve to absorb engine vibration, but cannot allow a great relative dislocation.

The recent tendency for the design of a small watercraft includes the request for a more slender engine room with narrower width than the conventional one which can accomodate the engine and the exhaust system. However, the entire width of the engine including the expansion chamber according to the conventional exhaust system is too wide to be placed in a narrower engine room. On the other hand, if the engine and the expansion chamber are reduced in size to be placed in a narrower engine room, the engine becomes short of output necessary for propulsion.

OBJECT AND SUMMARY OF THE INVENTION

To solve the above problems, the first object of the invention is to provide an exhaust system for a small watercraft engine which can ensure propulsion force enough to propel a small watercraft and can be placed effectively in a narrower engine room as well as can eliminate the need for a connection pipe between the expansion chamber and the successive muffler.

The second object of the invention is to provide an exhaust system for a small watercraft engine which can prevent cooling water in the system from entering the engine through an exhaust gas passage of the expansion chamber even with the small watercraft overturned.

Further, the third object of the invention is to provide an exhaust system for a small watercraft engine which includes elastic fitting devices that can absorb a longitudinal and lateral relative dislocation of exhaust pipes or an exhaust pipe and the muffler at their connection portions, and have little thermal deterioration and simple construction as well as can be installed easily and manufactured at inexpensive costs.

To achieve the first object of the invention, the exhaust system for a small watercraft engine according to the invention disposes the engine and the expansion chamber independently of each other along the longitudinal direction; and connects the exhaust port of the engine and the inlet of the expansion chamber through an exhaust pipe.

It is desirable to install the engine on the hull via a damper, and fix the exhaust pipe to the engine as well as fix the expansion chamber to the hull to connect the inlet of the expansion chamber and the outlet of the exhaust pipe through a fitting having heat resistance and flexibility.

The entire portion or a latter half of the expansion chamber may be inserted into the muffler following the expansion chamber.

With the engine exhaust system according to the invention as described above, only an exhaust pipe having a smaller diameter than the expansion chamber is integrally installed on the engine. As a result, the width of the entire engine (including the exhaust pipe) can be about same as the one of the engine body. Further, the weight of the exhaust pipe is considerably lighter than the expansion chamber. Therefore, the expansion chamber installed at a lower elevation does not cause the center of gravity of the entire engine to become higher, and permits the engine and the expansion chamber to be effectively accomodated in the engine room. Since installation of the expansion chamber is not restricted by the engine space, and can make full use of the width of engine room, the expansion chamber can ensure a shape and capacity which can fully display engine capabilities. Further, when the expansion chamber is fixed to the hull to connect the inlet of the expansion chamber and the outlet of the exhaust pipe via a fitting having heat resistance and flexibility, the fitting can absorb vibrations from the engine to cut off the transmission of vibration to the expansion chamber, thereby improving the durability of the expansion chamber.

Further, placing the entire portion or a latter half of the expansion chamber into the muffler following the expansion chamber can eliminate a connecting pipe necessary to connect the both between the expansion chamber and muffler, thus permitting a less pipe resistance (back pressure of engine) than the case using the connecting pipe, thereby leading to an improved engine power.

To achieve the second object of the invention, the exhaust system for a small watercraft engine according to the invention connects the outlet of the exhaust pipe connected to the engine exhaust port and the inlet of the expansion chamber disposed independently of th engine by a metal pipe or a fitting having flexibility and heat resistance; inserts the entire portion or a latter half of the expansion chamber into the muffler; installs the inlet of the delivery pipe leading outboard from the muffler in the vicinity of of the bottom of the expansion chamber; and positions the outlet of the expansion chamber in a place removed from the inner wall of the muffler; and introduces cooling water without passing through the exhaust gas passage of the expansion chamber.

With the exhaust system of the engine as constructed above according to the invention, cooling water from the engine or from outboard is introduced into the muffler without passing through the exhaust gas passage of the expansion chamber, and then the cooling water introduced into the muffler, with the inlet of the outlet pipe of the muffler being disposed in the vicinity of the bottom of the muffler, is discharged outboard along with the exhaust gas, thus leaving only a small amount of cooling water in the vicinity of the bottom of the muffler. Besides, the outlet of expansion chamber (a latter half thereof) or the outlet of the metal pipe or fitting is located at a place removed from the inner wall of the muffler. For this reason, even if a small watercraft should be overturned, a small amount of the cooling water left in the muffler only shifts along the inner wall thereof, thus being not allowed to enter into expansion chamber from the outlet thereof. Since the cooling water is introduced into the muffler without passing through the exhaust gas passage of the expansion chamber, there is no chance of cooling water entering the engine from the exhaust gas passage of the expansion chamber.

To achieve the third object of the invention, the exhaust system for a small watercraft engine according to the invention fits an outer cylinder opened at one end thereof around the expansion chamber with a radial spacing while fixing the other end side of the outer cylinder around the expansion chamber; inserts the expansion chamber into the muffler having a larger diameter than the expansion chamber while placing the open end of the outer cylinder and the open end of the muffler with a gap so as for them to butt against each other; connects the outer cylinder and the muffler by tightly covering an elastic fitting of rubber tube over the open ends of the outer cylinder and the muffler; and flows cooling medium introduced from the outer cylinder into the muffler via the elastic fitting.

The passage of the cooling medium at the open end of the outer cylinder can be opened only to the above side of the outer cylinder.

Further it is desirable to divide the space in the muffler with a weir wall into one inner chamber portion to be inserted by the expansion chamber and the other inner chamber portion for others; make the height of the weir wall equal to the top position of the elastic fitting or higher than that; connects the outer cylinder and the muffler by tightly covering an elastic fitting of rubber tube over the open ends of the outer cylinder and the muffler; and flows cooling medium from the outer cylinder or the muffler into the elastic fitting.

With the exhaust system as above described according to the invention, exhaust gas from the engine flows into the muffler from the expansion chamber. For a relative longitudinal and lateral dislocation of these two members at their connection portions, the expansion chamber will shift relatively to and in the muffler, in a longitudinal direction within a range of gap between the open ends of the cylinder and the muffler and in a lateral direction within a range of lateral gap between the expansion chamber and the muffler; and the outer cylinder will relatively shift along with the expansion chamber; and at the same time shrinkage or elongation of the elastic fitting in the longitudinal direction and lateral deformation thereof will permit the relative dislocation. The elastic fitting can be cooled by cooling medium such as water, oil, air passing the inner circumferential surface, thus avoiding thermal deterioration due to hot exhaust gas.

According to the exhaust system in which cooling medium passage opening is provided only at the top portion, when a flow rate of cooling medium flowing into the elastic fitting from the outer cylinder decreases, after the cooling medium deposits in the outer cylinder up to the elevation of the top passage, the cooling medium flows out from the passage opening to the top of the elastic fitting to flow down along the circumference of the expansion chamber under the elastic fitting, thus cooling the inside surface of the elastic fitting. Therefore, even if exhaust gas in the muffler will be flowing into the outer cylinder through the elastic fitting, cooling medium flowing out from the top passage opening prevents exhaust gas from flowing into the the outer cylinder and the elastic fitting, thus protecting the elastic fitting from being deteriorated by heat due to hot exhaust gas.

Further, according to the exhaust system in which the weir wall is provided in an inner space of a muffler, cooling water flowing into the expansion chamber from the outer cylinder etc. through the elastic fitting or without passing the elastic fitting flows into the exhaust pipe to stay in the inner chamber portion divided by the weir wall, finally accumulating up to or over the top end of the elastic fitting. Therefore, the elastic fitting comes equal to or under the top surface of the cooling water always standing in the muffler, introducing the cooling water into the elastic fitting from the muffler, thus permitting cooling of the inside of the elastic fitting, even if a flow rate of cooling water flowing into the muffler from the outer cylinder through the elastic fitting should decrease, or if flowing of the cooling water should be disrupted; as well as since there is no chance of exhaust gas flowing into the elastic fitting from the muffler, the elastic fitting is protected from thermal deterioration due to hot exhaust gas.

BRIEF DESCRIPTION OF THE DRAWINGS

FIGS. 19A, 19B, and 19C are side views showing a deformation of the known bellows-type flexible metal tube according to the prior art;

FIGS. 20 to 22 are sectional views showing the engine exhaust systems according to the prior art.

DETAILED DESCRIPTION OF PREFERRED EMBODIMENTS

Figure 1:
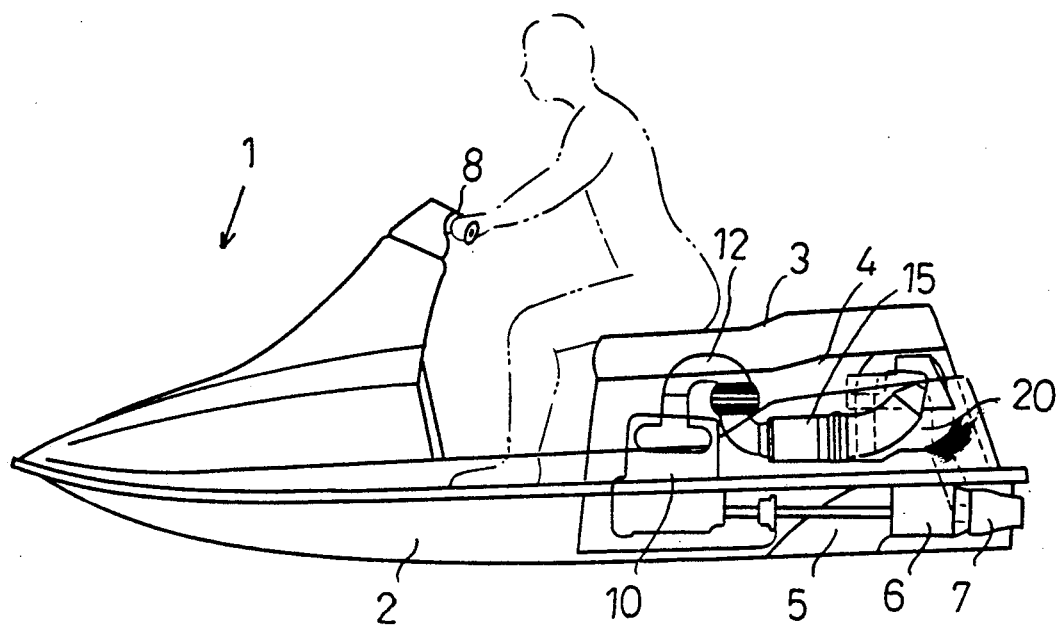
FIG. 1 is a side view showing a small watercraft provided with an engine exhaust system according to the invention.
Figure 2:
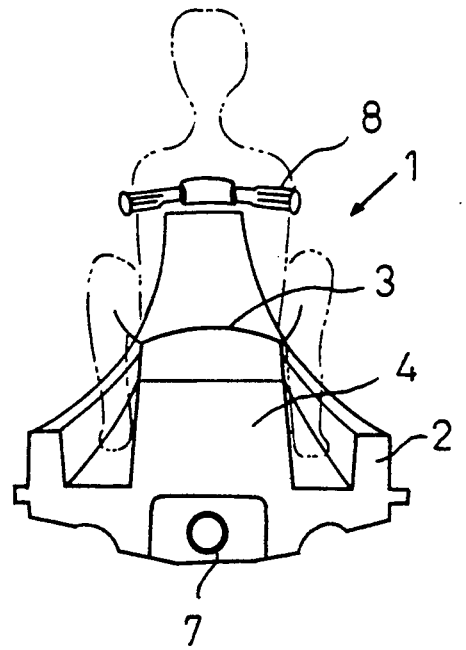
FIG. 2 is a rear view of the small watercraft in FIG. 1.

Now, preferred embodiments according to the invention will be described referring to the accompanying drawings:

FIG. 1 is a side view showing a small watercraft provided with an engine exhaust system according to the invention; and FIG. 2 is a rear view of the small watercraft in FIG. 1:

As shown in FIG. 1, a small water craft 1 is provided with a tandem-type seat 3 close to the rear portion of a hull 2. Inside and under the seat 3 an engine room 4 is formed. The engine room 4 is narrower in width than the hull 2 as shown in FIG. 2, and is slender in the longitudinal direction of the hull 2. In the engine room 4, as shown in FIG. 1, along the longitudinal direction a 2-cycle water cooled engine 10, an exhaust pipe 12, an expansion chamber 15 and a muffler 20 are disposed in the order from front to rear. Further, at the rear end portion of the bottom of the hull 2, a waterjet pump 6 driven by the engine 10 via drive shaft 5 and a steerable nozzle are disposed in the order. Numeral 8 is a steering handle, which can steer the small watercraft 1 by horizontally turning the steerable nozzle 7.

Figure 3:
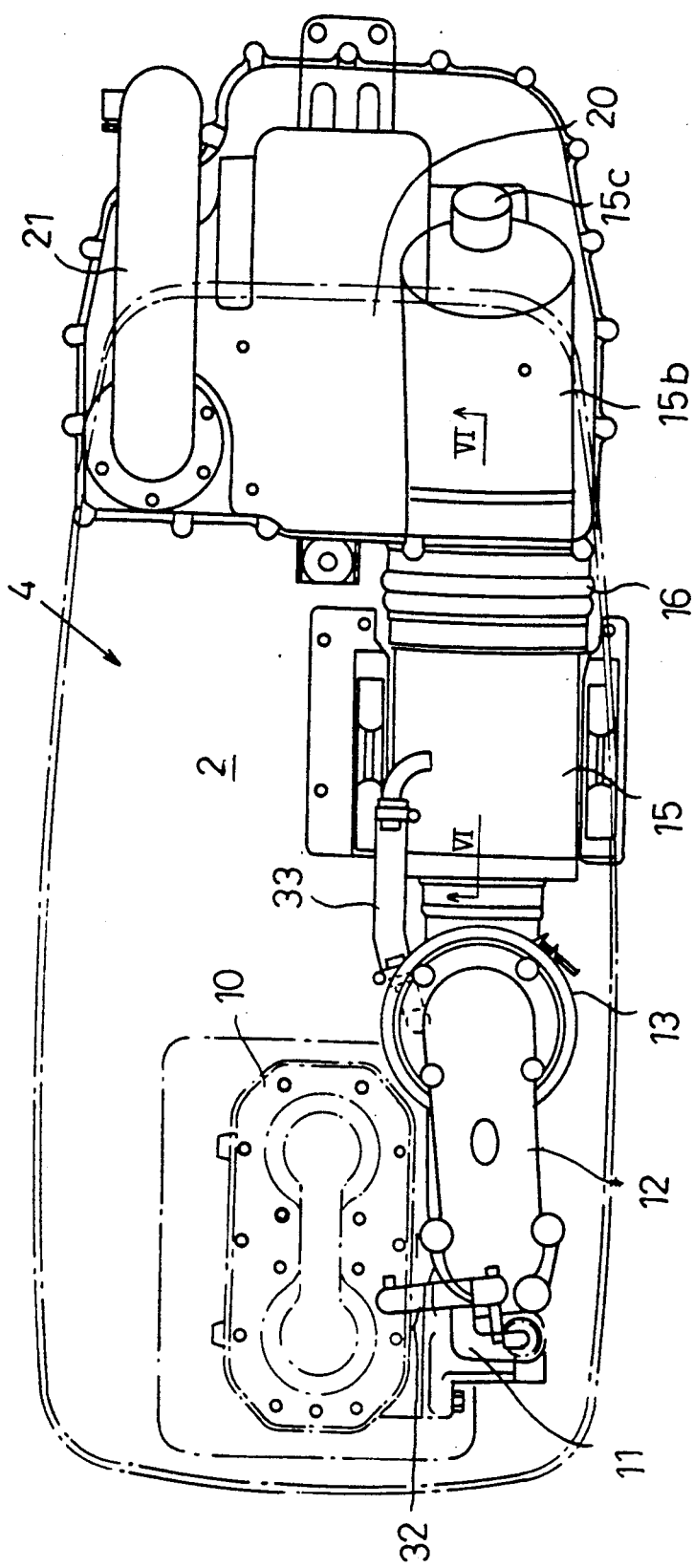
FIG. 3 is a plan view of an embodiment particularly showing the engine housed in the engine room and its exhaust system.
Figure 4:
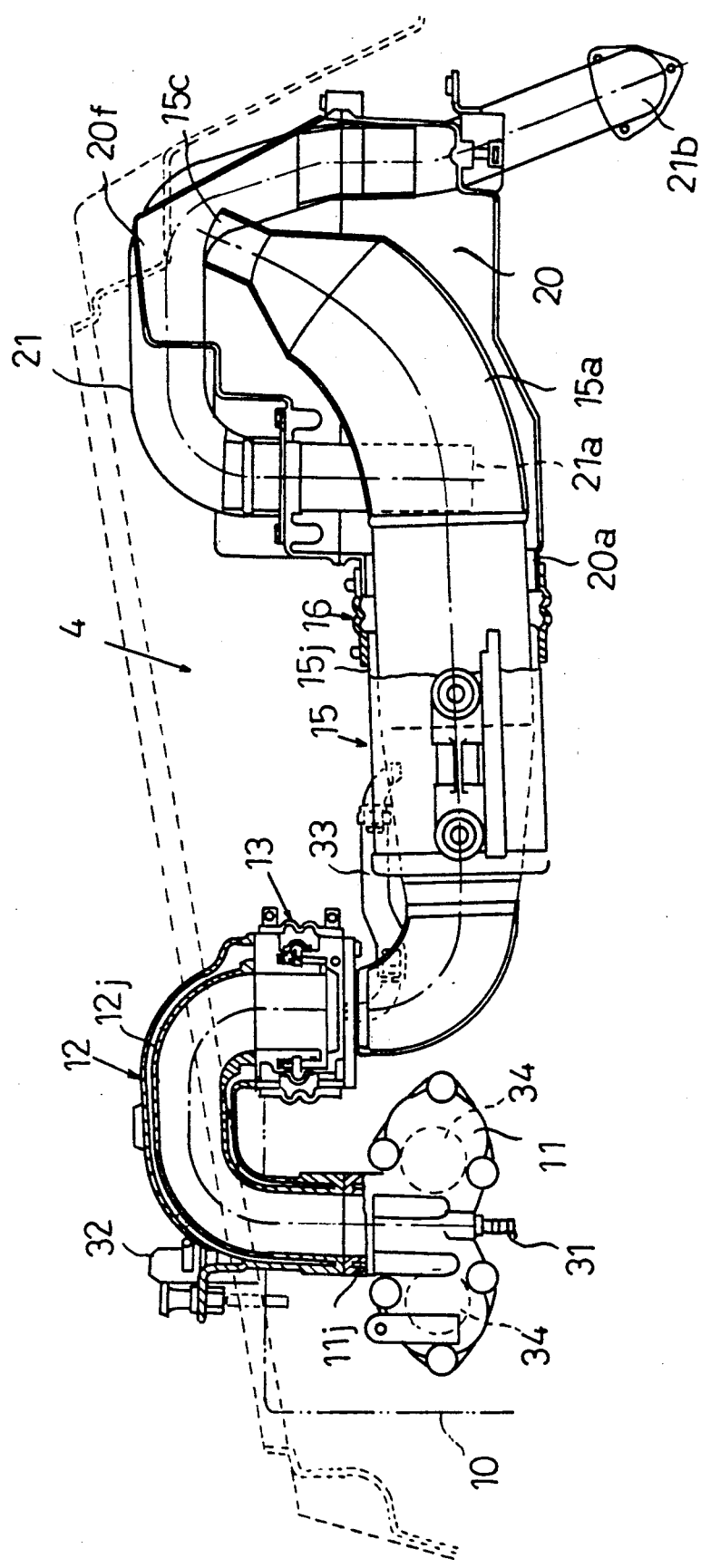
FIG. 4 is a side view showing the embodiment in FIG. 3.
Figure 5:
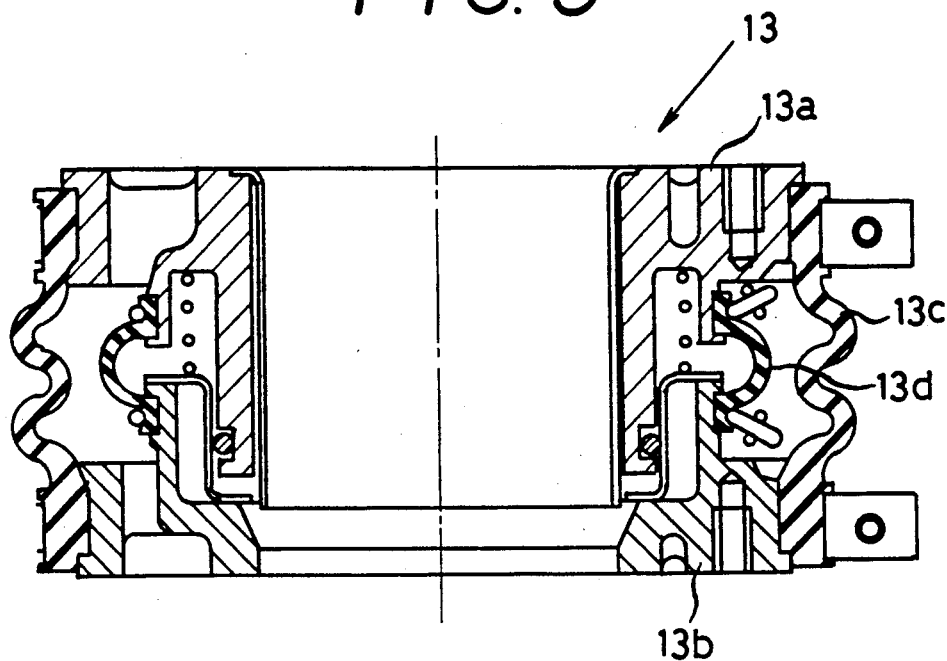
FIG. 5 is a cross sectional view showing an example of a fitting having thermal durability and flexibility.

FIG. 3 is a plan view of an embodiment particularly showing the engine housed in the engine room and its exhaust system; and FIG. 4 is a side view showing the embodiment in FIG. 3:

As shown in these drawings, the engine 10 is disposed on the hull 2 through an elastic damper (not shown) at the midcenter of the front end portion in the engine room 4. As shown in FIG. 4, at the exhaust port portion of the engine 10, an exhaust pipe 12 is installed integrally with the engine 10 through an exhaust manifold 11. At the rear of the engine 10 (rear port side in this embodiment), an expansion chamber 15 is fixed to the hull 2 with bolts. The rear end of the exhaust pipe 12 and the inlet of the expansion chamber 15 is connected by a fitting 13 having an excellent flexibility and thermal durability. The fitting 13, for instance as shown in FIG. 5 in detail, is so constructed that the front half 13a and the latter half 13b can relatively shift to each other in their axial and lateral directions. Cooling water is passed between inner and outer sleeves 13c and 13d to cool the entire fitting 13.

At the rear end of the engine room 4, as shown in FIGS. 3 and 4, a muffler 20 is fixed on the hull 2 over the width with bolts, whose inside is divided with a plurality of partitions having communication holes. The latter half portion 15a of the expansion chamber 15 rises up almost close to an extended out portion 20f of a top surface of the muffler 20, so that an outlet opening 15c of the latter half portion 15a is disposed in a considerably higher position than an inlet opening 21a of an outlet pipe 21 described later. In this embodiment, for installation convenience, a flexible fitting 16 is inserted between the expansion chamber 15 and the muffler 20. At the outlet side of the muffler 20, one end portion of a reverse-U-shape outlet pipe 21 is inserted, while the other end portion is exposed to outboard.

A cooling mechanism is provided for using engine cooling water to cool the fittings 13 and 16 and reduce the temperature of exhaust gas. More particularly, around the exhaust manifold 11, the exhaust pipe 12 and the body of expansion chamber 15, respective water jackets 11j, 12j and 15j are disposed. One end of a cooling water introducing pipe (not shown) opens in the waterjet pump 6 (FIG. 1) to delivery cooling water pressurized by the pump 6 to the water jacket (not shown) of the engine 10 via a cooling water introducing pipe 31 (FIG. 4) of the exhaust manifold 11. After the water cools the engine, the cooling water is delivered to an water jacket 12j of the exhaust pipe 12 via a pipe 32 at the top of the engine cylinder head to cool the exhaust pipe 12. Then, the cooling water is further delivered to the fitting 13 for cooling. After that, the cooling water for the fitting 13 is delivered to a water jacket 15j of the body of expansion chamber 15 via a pipe 33 for cooling, and then to the successive fitting 16 for cooling. The cooling water passes through the water jackets 12j and 15j of the exhaust pipe 12 and the expansion chamber 15, not in the exhaust gas passage of them. The cooling water which has passed through the fitting 16 is discharged into the muffler 20 for cooling, and finally discharged outboard through an outlet pipe 21 along with exhaust gas from the engine 10.

Figure 6:
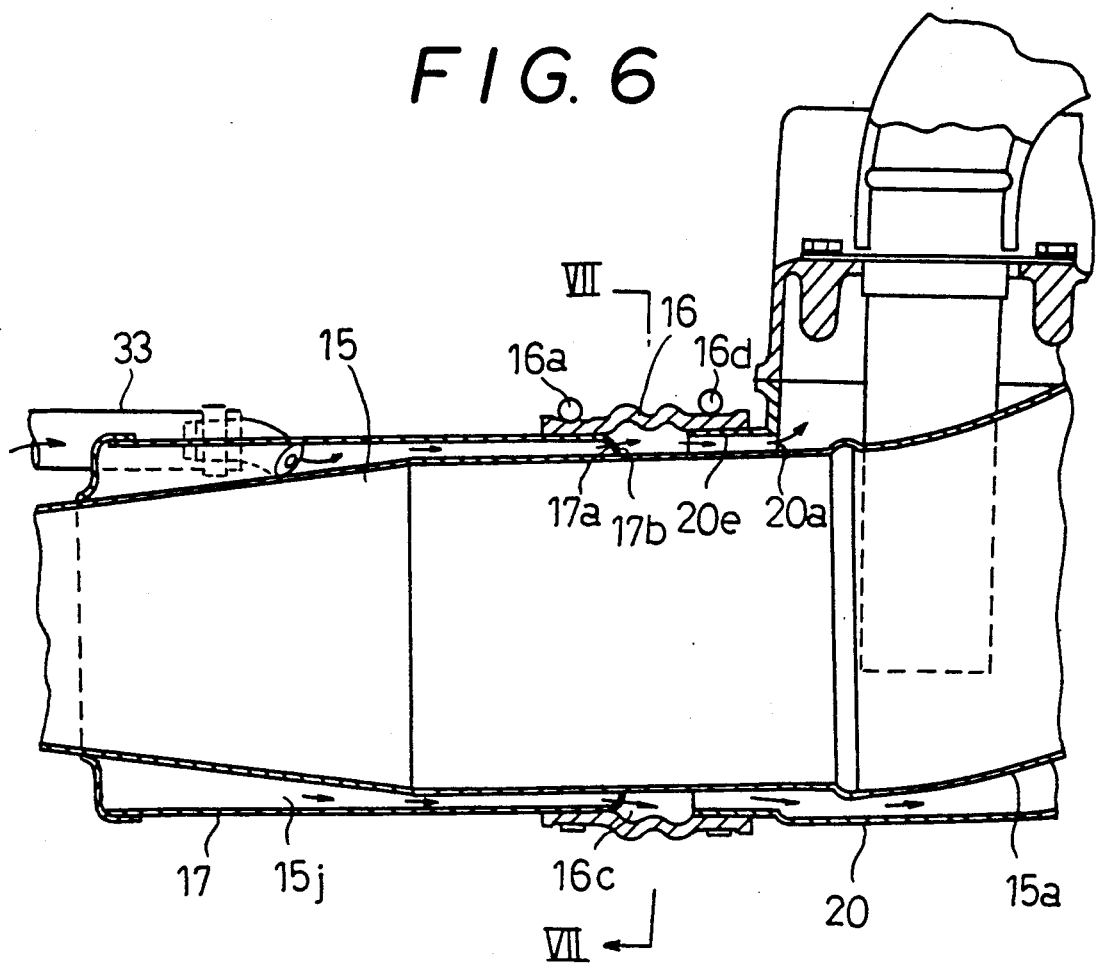
FIG. 6 is a partially enlarged cross sectional view taken along line VI—VI in FIG. 3.

FIG. 6 is a partially enlarged cross sectional view taken along line VI—VI in FIG. 3 to show main parts of the expansion chamber 15:

In the drawing, Numeral 15j is an water jacket, 17 and 16 respectively an outer cylinder and an elastic fitting forming the water jacket 15j. The expansion chamber 15 and the muffler 20 are connected with the elastic fitting 16.

Figure 7:
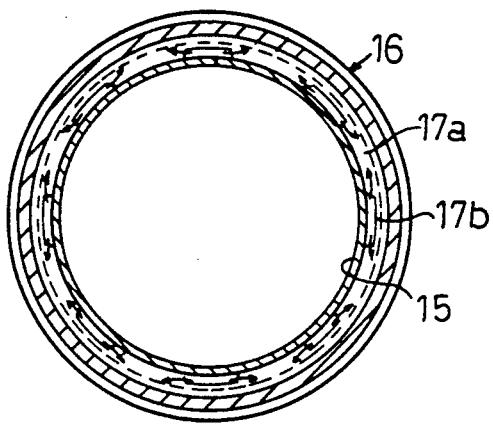
FIG. 7 is a cross sectional view taken along line VII—VII in FIG. 6.

As shown in FIGS. 3 and 4, the engine side of the expansion chamber 15 is connected to the exhaust pipe 12 of the engine 10 via the flexible fitting 13, which prevents vibration of the engine 10 from transmitting to the expansion chamber 15. However, since the muffler is installed independently of the expansion chamber, the flexible fitting 16 is used to connect the expansion chamber 15 and the muffler 20 to ease their machining and installation in the longitudinal and lateral directions. In the left-side wall of the muffler 20 an opening 20a having larger diameter than the expansion chamber 15 is opened, from which an exhaust pipe portion 20b extends out integrally. Around the expansion chamber 15, an outer cylinder 17 whose one end is closed and the other end is opened is fitted with radial gap, and the closed end is welded to the outer surface of the expansion chamber 15. The open end of the outer cylinder 17 is bent inward at the peripheral portion 17a, whose inner end is butted against the outer circumferential surface of the expansion chamber 15. As shown in FIG. 7, in the circumferential portion 17a, a plurality of communication holes 17b are opened at equal intervals in the circumferential direction.

The rear end portion 15a of the expansion chamber 15 is passed through the exhaust pipe portion 20b and the opening 20a and inserted into the muffler 20. The open ends of the outer cylinder 17 and the exhaust pipe portion 20b faces each other with gap. The elastic fitting 16 (a bellows-shape cylinder formed with heat-resisting rubber or other elastic materials) covers in close contact over the open ends of the outer cylinder 17 and the exhaust pipe portion 20c, and is tightened with a band 16a to connect flexibly the outer cylinder 17 and the exhaust pipe portion 20b. One end of a cooling water introducing pipe 33 is connected to the outer cylinder 17 to introduce engine cooling water (FIG. 4) into the outer cylinder 17, and further the cooling water is introduced into the elastic fitting 16 from the outer cylinder 17 and to the muffler 20. As a result, the elastic fitting 16 is cooled by the cooling water. Besides, since the inner surface of the elastic fitting 16 is removed away with gap from the outer surface of the expansion chamber by the cooling water passage 16c formed between the elastic fitting 16 and the expansion chamber 15, and the outer surface of the elastic fitting 16 is exposed to the atmosphere, the elastic fitting 16 is prevented from thermal deterioration due to high temperature exhaust gas passing through the expansion chamber 15. Further, the inner surface of the elastic fitting 16 is protected by cooling water from high temperature exhaust gas in the muffler 20, which also serves to prevent thermal deterioration of the elastic fitting 16.

Variations in machining dimensions and installation alignments of the expansion chamber 15 and the muffler 20 can be absorbed by the longitudinal elongation and shrinkage and the lateral deformation of the elastic fitting 16.

However, the expansion chamber 15 and the muffler 20 having a good precision of machining and installation can eliminate the need for the flexible fitting 16, thus allowing a solid flange to be used for connection. In the case where the expansion chamber 15 and the muffler 20 is directly coupled without a fitting 16 to insert the latter half 15a of the expansion chamber 15 into the muffler 20, it is desirable to use a heat-resisting seal member (not shown) for sealing between the insert opening 20a of the muffler 20 and the outer wall of the latter half portion 15a of the expansion chamber 15.

In this embodiment, the expansion chamber 15 is disposed at the rear port of the engine 10, but the position of the muffler may be decided at one's disposal considering the shape of an engine room 4 or the desirable positions of oil pump and other accessories (not shown). The above embodiment is so configured that only the latter half portion 15a of the expansion chamber 15 is inserted into the muffler 20, and the water jacket 15j is disposed at the front half, considering the arrangement of accessories and the shape of the engine room, but, depending on the shape and size of the muffler 20, the entire expansion chamber 15 may be housed in the muffler 20. In this case, the water jacket 15j for the expansion chamber 15 can be eliminated, thereby resulting in simple construction. Further, the exhaust system according to the invention can be also applied to a water cooled 4-cycle engine 10.

According to the configuration of the above embodiment, since there is no cooling water present in the exhaust gas passage of the exhaust pipe 12 and the expansion chamber 15 or in the vicinity of the outlets of them, and cooling water introduced into the muffler 20 via the fitting 16 is pushed through the muffler 20 by the exhaust gas (pressure) discharged from the outlet 15c of the expansion chamber 15 outboard from the outlet pipe 21, there may be left only a little amount of cooling water in the vicinity of the inlet 21a of the outlet pipe 21 in the muffler 20, and besides the position of stagnant cooling water may be removed away from the outlet 15c of the expansion chamber 15. Therefore, if the small watercraft should be overturned, there is no possibility of cooling water in the muffler to flow into the exhaust gas passage of the expansion chamber 15 or into the engine 10.

Figure 8:
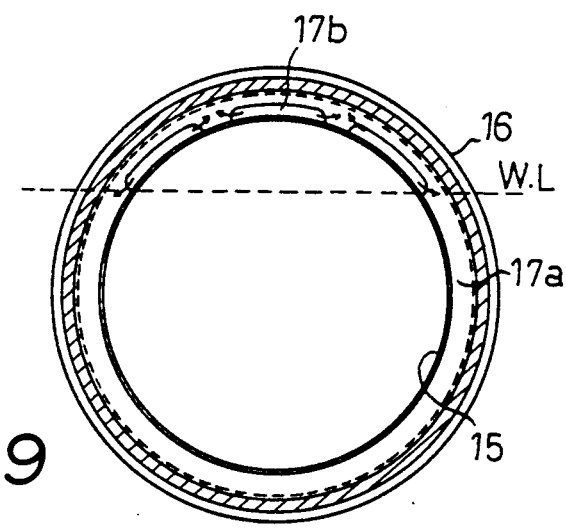
FIG. 8 is a cross sectional view corresponding to FIG. 7 showing another embodiment of an exhaust system according to the invention.

Next, FIG. 8 is a cross sectional view corresponding to FIG. 7 showing another embodiment of an exhaust system (elastic fitting 16) according to the invention;

Differently from the embodiment in FIG. 7, a few number of communication holes 17b are opened only at the top of the circumferential portion 17a of the outer cylinder 17 at intervals. In the case of the preceding embodiment where a number of communication holes 17b are opened at the full length of circumferential portion 17a, when a flow rate of cooling water is decreased, since the cooling water is flowing only in the bottom of the outer cylinder 17 and the elastic fitting 16, there may be a potential of insufficient cooling because the cooling water does not flow at the upper portion of the outer cylinder 17 and the elastic fitting 16. But, in this case, if flow rate of cooling water flowing into the elastic fitting 16 from the outer cylinder 17 is decreased, the cooling water will first accumulate up to the level just below the communication holes 17b at the top of the outer cylinder 17, and then will overflow through the communication holes 17b. The overflowing cooling water flows into the top portion of the elastic fitting 16, and then flows down through the cooling water passage 16c along the circumference of the expansion chamber 15 in the elastic fitting 16 to cool the inner circumference of the elastic fitting 16. Therefore, if exhaust gas is about to flow toward the side of the outer cylinder 17 via the elastic fitting 16 from the muffler 20, there is no chance of the exhaust gas flowing into the outer cylinder 17, thus ensuring sufficient cooling of the inner surface of the elastic fitting 16.

Figure 9:
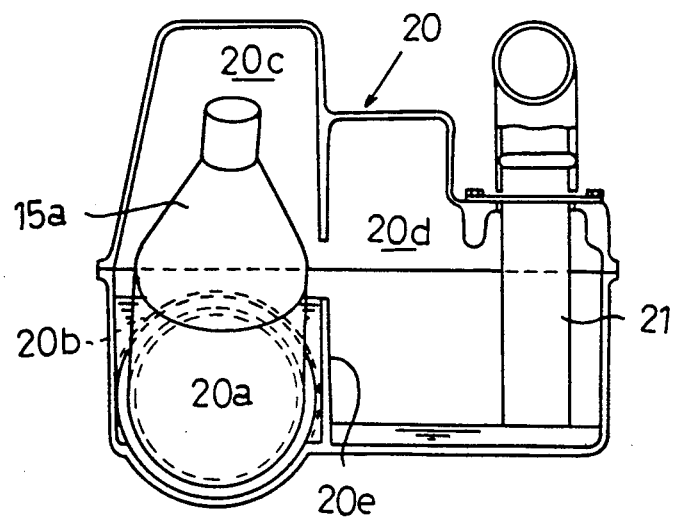
FIG. 9 is a cross sectional view showing a muffler configuration in separate embodiment of an exhaust system according to the invention.

FIG. 9 is a cross sectional rear view showing a muffler configuration in separate embodiment of an exhaust system according to the invention:

As shown in the drawing, the inside of the muffler 20 is divided by a weir wall 20e into a chamber 20c in which the end portion 15a of the expansion chamber 15 is housed and a chamber 20d in which the outlet pipe 21 is housed. The height of the weir wall 20e is adjusted to equal to or slightly higher than the top end of the exhaust pipe portion 20b (or the elastic fitting 16). As a result, cooling water flowing into muffler 20 via the elastic fitting 16 from the outer cylinder 17 will first accumulate in the chamber 20c in which the expansion chamber 15 is housed. When the height of cooling water accumulated in the chamber 20c rises up to equal to or higher than the top level of the exhaust pipe portion 20b, the accumulated cooling water overflows the weir wall 20e to flow into the adjacent chamber 20d. The cooling water flowing into the chamber 20d is pushed up by the exhaust gas (pressure) discharged into the muffler 20 from the expansion chamber 15 to be discharged outboard from the outlet pipe 21 along with exhaust gas. Therefore, even if a flow rate of cooling water flowing into the muffler 20 via the elastic fitting 16 from the outer cylinder 17 is decreased, or cooling water flow is interrupted, the outer cylinder 17 and the elastic fitting 16 are blocked by the cooling water accumulating at all times in the chamber 20c in the muffler 20, thus preventing the exhaust gas flowing into the muffler 20 from flowing into or coming into contact with the elastic fitting 16 and the outer cylinder 17. When the cooling water which has accumulated in the chamber 20c comes higher than the top end of the outer cylinder 17 or the elastic fitting 16, they would be always flooded with cooling water, there is no need to open the communication holes 17b of cooling water only at the top as shown in FIG. 6, even if flow rate of cooling water is decreased. But, even when the communication holes 17b is limited only to the top portion, the muffler 20 shown in FIG. 7 is effective.

Figure 10:
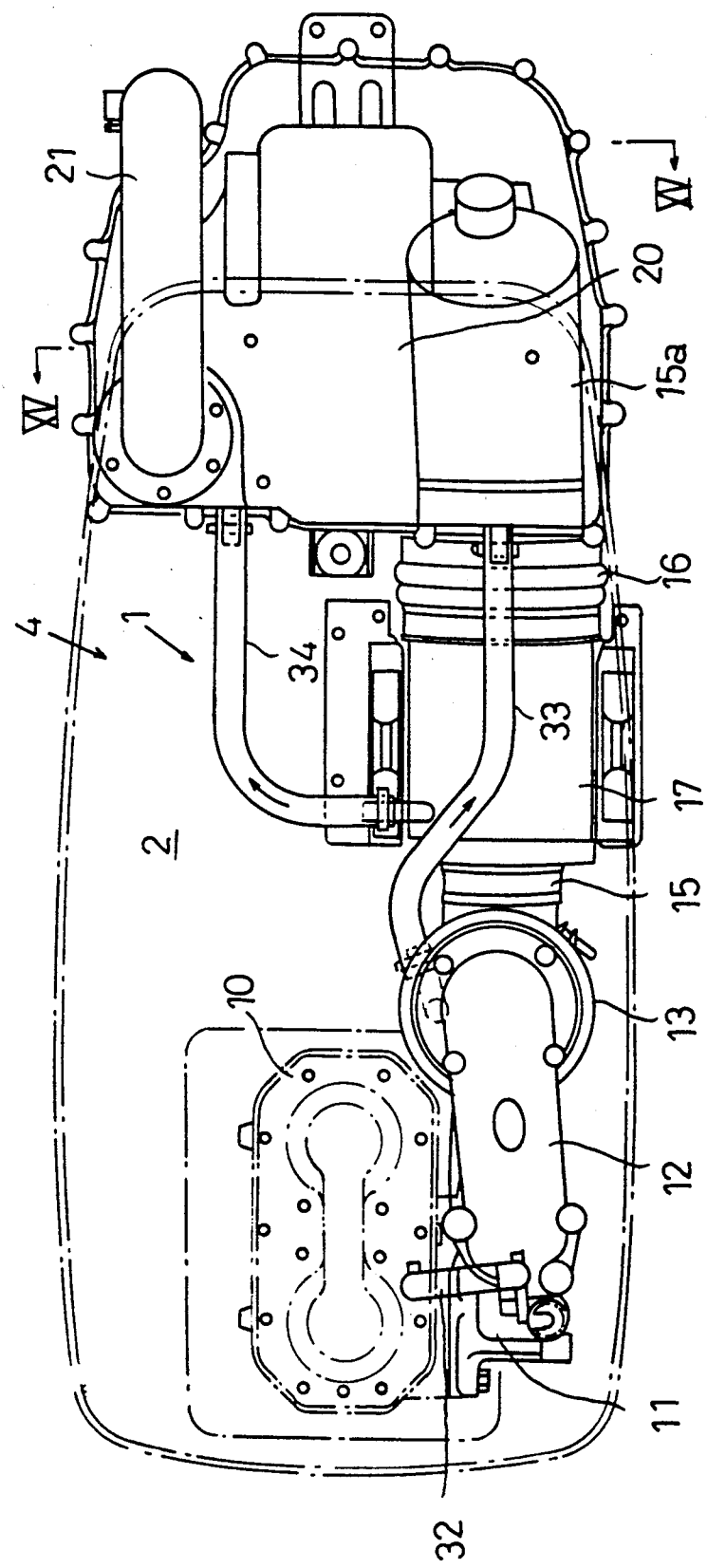
FIGS. 10 and 11 respectively are plan and side views showing further separate embodiment of an exhaust system according to the invention.
Figure 11:
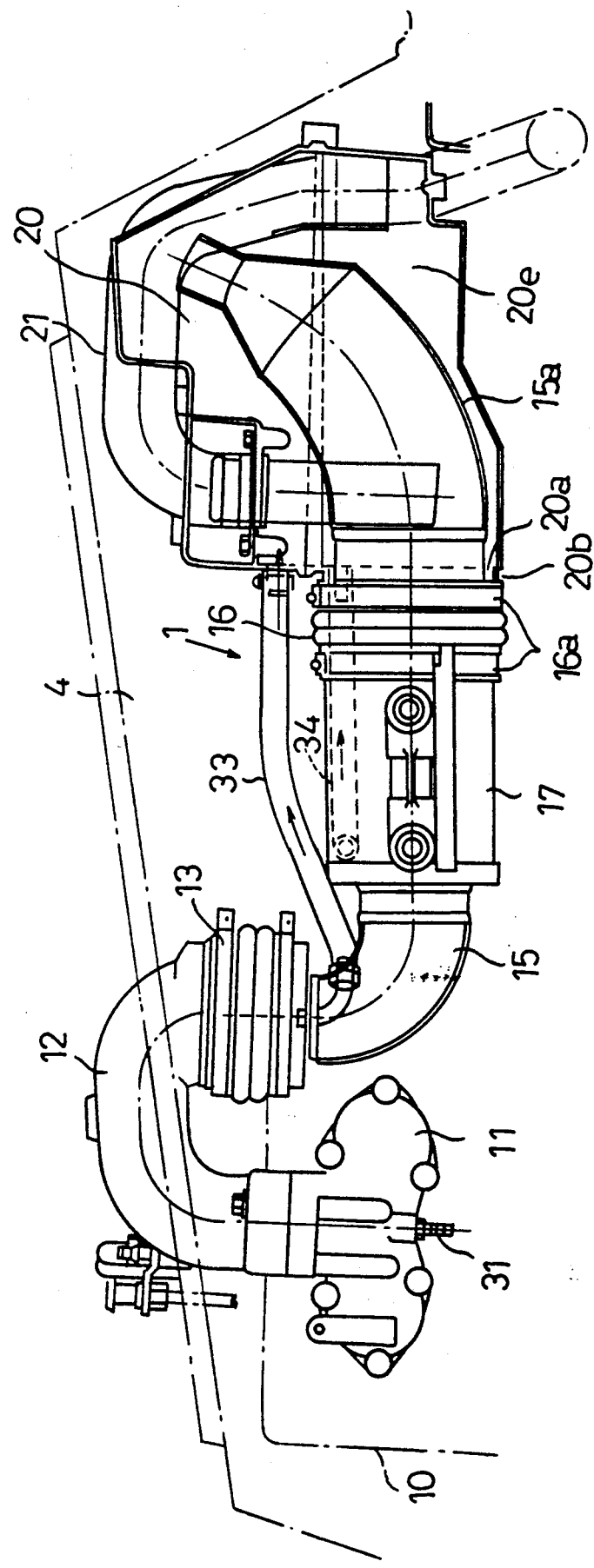
Figure 15:
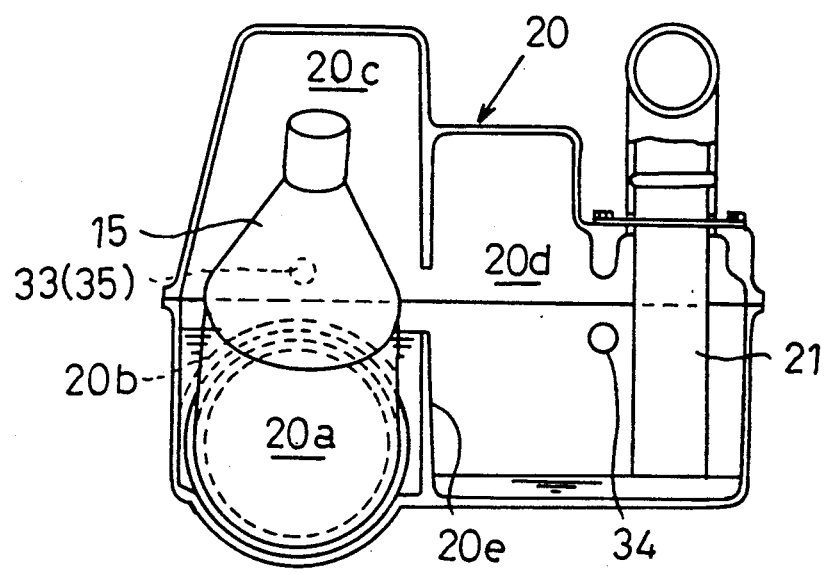
FIG. 15 is a cross sectional view taken along line XV—XV in FIGS. 10 and 14.
Figure 16:
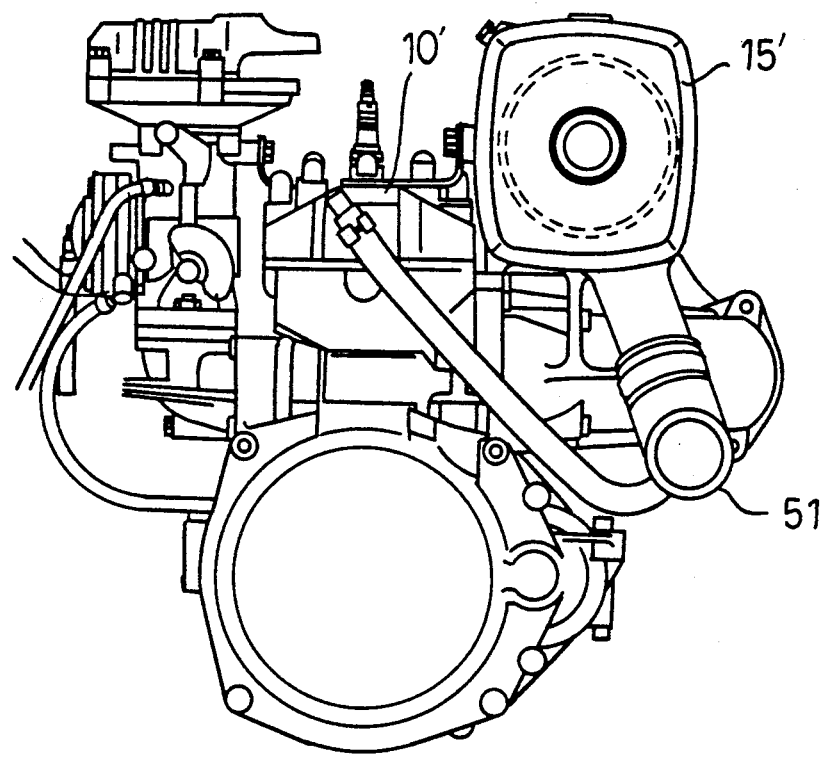
FIG. 16 is a front view showing the engine exhaust system according to the prior art.
Figure 17:
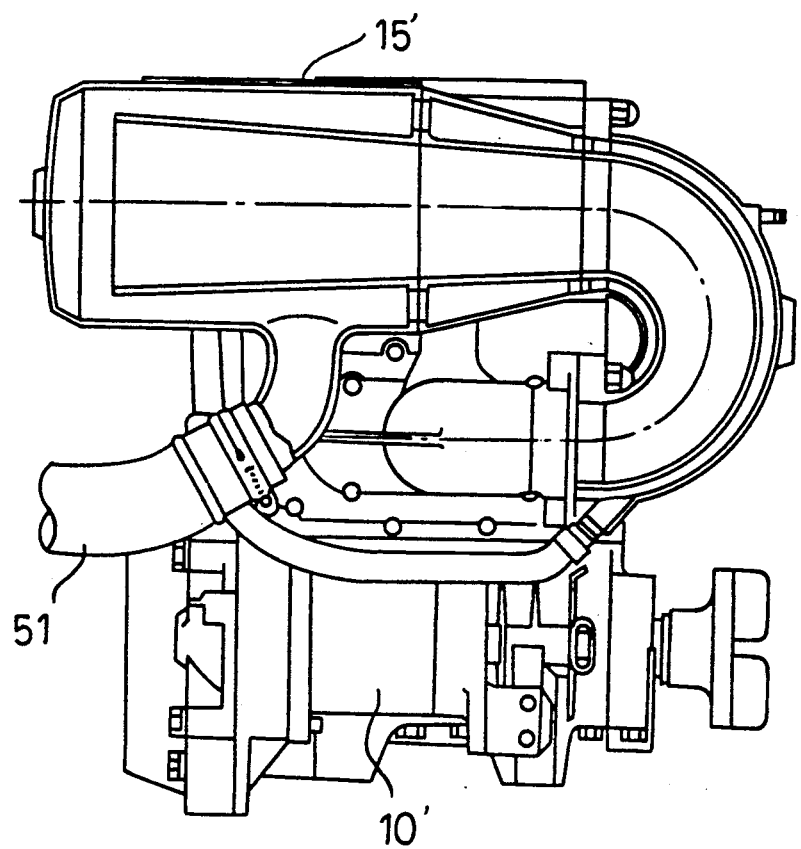
FIG. 17 is a side view showing the engine exhaust system according to the prior art.
Figure 18A:
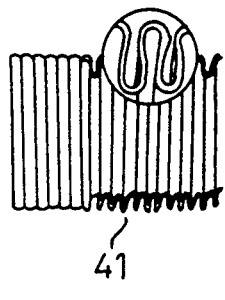
FIGS. 18A, 18B, 18C, 18D, 18E and 18F are front views showing the known flexible metal tube according to the prior art.
Figure 18B:
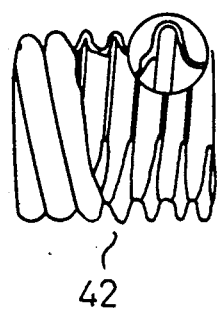
Figure 18C:
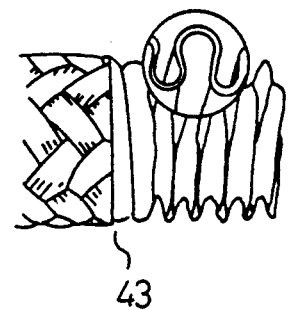
Figure 18D:
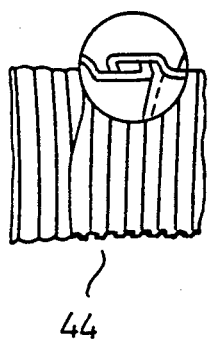
Figure 18E:
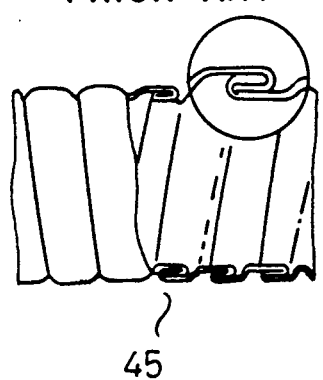
Figure 18F:
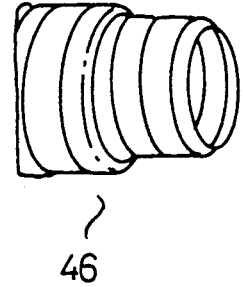

FIGS. 10 and 11 respectively are plan and side views showing further separate embodiment of an exhaust system according to the invention:

The exhaust system does not connect the introducing pipe 33 to the outer cylinder 17, but to the top (FIG. 15) of the chamber 20c in the muffler 20. After cooling water from the water jacket (not shown) of the engine 10 is introduced into the chamber 20c with the introducing pipe 33 and the like, the introduced cooling water into the chamber 20c is discharged into the outer cylinder 17 through the elastic fitting 16. And, one end of the introducing pipe 34 whose other end is connected to the outer cylinder 17 is connected to the intermediate section (FIG. 15) of the chamber 20c adjacent to the muffler 20 to discharge cooling water flowing into the outer cylinder 17 to the chamber 20d in the muffler 20, thus discharging the cooling water outboard along with exhaust gas. Instead of connecting the one end of the introducing pipe 34 to the muffler 20, cooling water may be discharged directly outboard. The exhaust system 1 above configured can obtain the same function as the one shown in FIG. 9.

Figure 12:
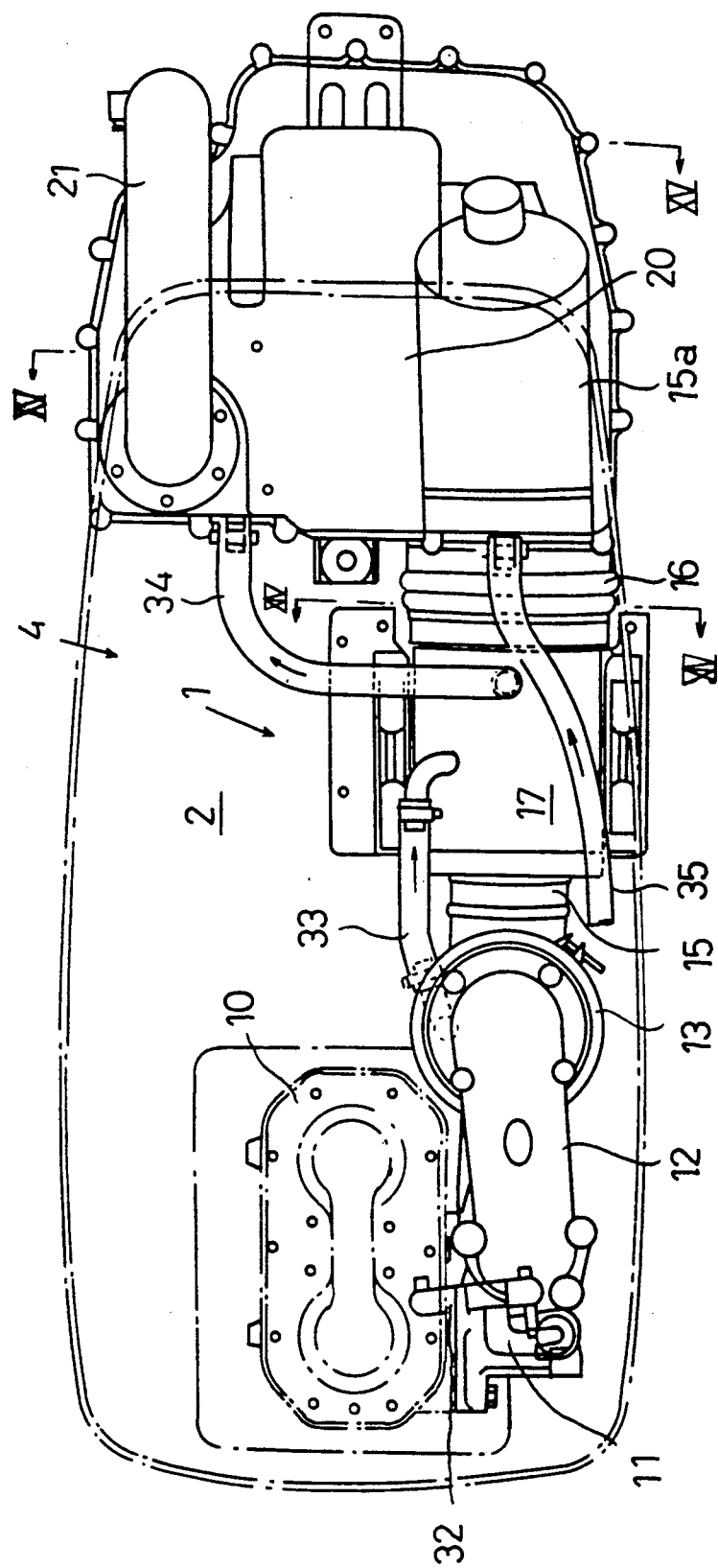
FIGS. 12 to 14 respectively are plan and side views and cross sectional view taken along line XIV—XIV in FIG. 12 showing further separate embodiment of an exhaust system according to the invention.
Figure 13:
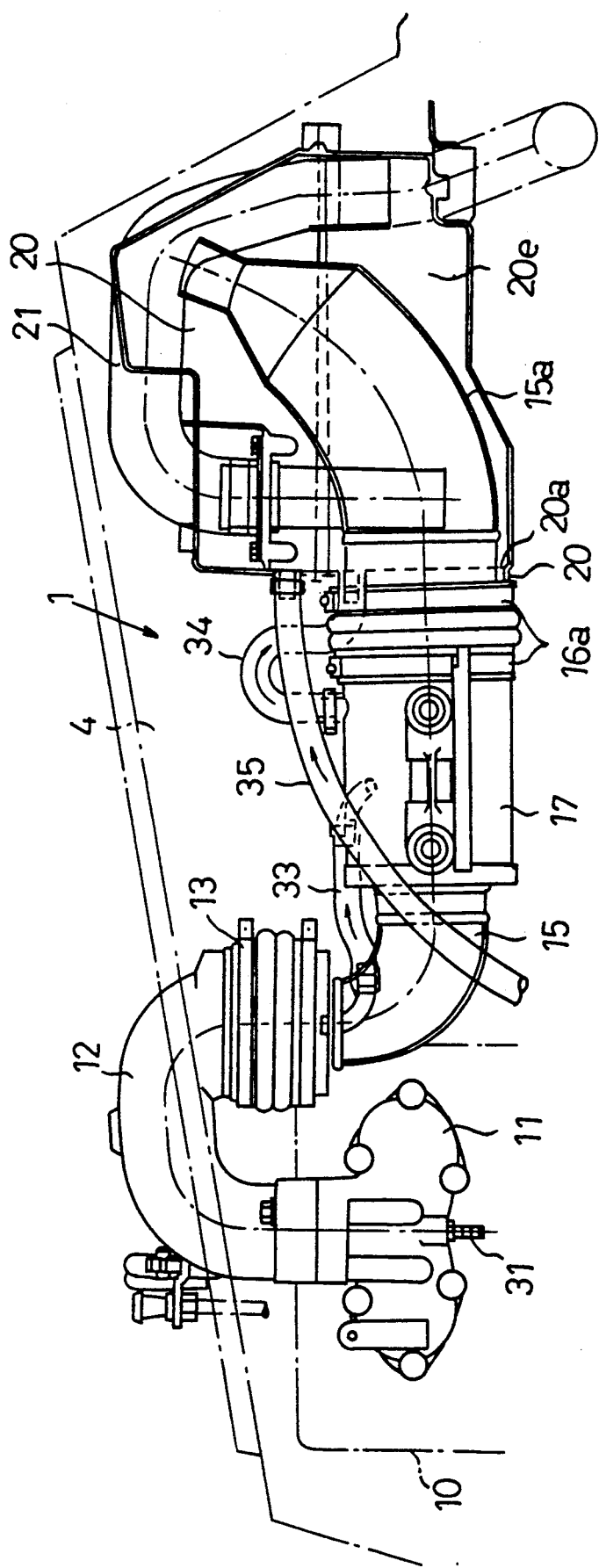
Figure 14:
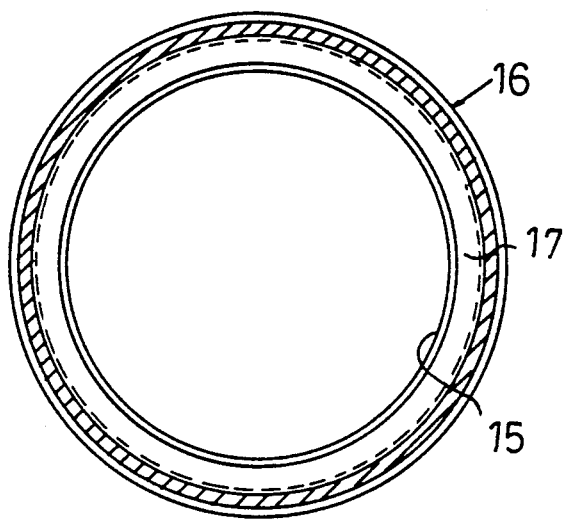

FIGS. 12 to 14 respectively are plan and side views and cross sectional view taken along line XIV—XIV in FIG. 12 showing further separate embodiment of an exhaust system according to the invention:

With the embodiment of the exhaust system, as shown in FIG. 14, no communication holes 17b (FIGS. 7 and 8) for cooling water are provided in the circumferential portion 17a of the outer cylinder 17 to separate the outer cylinder 17 and the elastic fitting 16 with the circumference portion 17a. Instead of providing the communication holes 17b in the preceding embodiments, separate cooling water (for example, outboard water) which does not pass the water jacket (not shown) of the engine 10 is directly introduced to the top of the chamber 20c in the muffler 20 through a cooling water introducing pipe 35 of another cooling system, and then the cooling water accumulated in the chamber 20c is led into the elastic fitting 16 for cooling. Therefore, one end of the introducing pipe 35 of another cooling system is connected to the top of the chamber 20c in the muffler 20. The cooling water discharged into the outer cylinder 17 from the introducing pipe 33, as with the preceding embodiment, is discharged at the intermediate portion of the chamber 20c in the muffler 20 through the introducing pipe 34 from the outer cylinder 17. Instead of connecting the other end of the introducing pipe 34 to the muffler 20, as with the preceding embodiment, cooling water may be directly discharged. The exhaust system 1 according to the embodiment thus configured can not only obtain the same effect as the one in FIG. 9, but also the cooling effect of the elastic fitting 16 can be further enhanced, because lower-temperature cooling water without passing through the engine 10 passes through the elastic fitting 16 via the chamber 20a in the muffler 20.

All these embodiments are applied to an engine 10 in a small watercraft, but may be used, for example, for a circulation line of superheated steam in a boiler.

What is claimed is:

1. An engine exhaust system for a small watercraft having a hull with an engine room and an engine in said engine room fixed to the hull through a damper and having an exhaust port, said system comprising an expansion chamber fixed to the hull and having an inlet, said engine and expansion chamber being mounted independently of each other along a longitudinal direction of the engine room, an exhaust pipe having an outlet fixed to the engine and connecting said exhaust port of said engine and said inlet of said expansion chamber, a fitting provided with thermal durability and flexibility connecting said inlet of said expansion chamber and said outlet of said exhaust pipe, and a muffler following said expansion chamber, and at least half of said expansion chamber is inserted into said muffler.

2. An engine exhaust system for a small watercraft as claimed in claim 1 wherein an inlet of an outlet pipe leading to outboard from said muffler is disposed in the vicinity of the bottom of said muffler; and an outlet of said expansion chamber is disposed in a place removed away from a wall inner surface of said muffler; cooling water is directly introduced into said muffler without passing through the exhaust gas passage in said expansion chamber.

3. An engine exhaust system for a small watercraft as claimed in claim 1 wherein an outer cylinder with one end thereof opened is fitted around said expansion chamber with radial spacing while the other end is fixed to the outer surface of said expansion chamber, said expansion chamber is inserted into said muffler having a larger diameter than said expansion chamber so as to butt an open end of said outer cylinder against an open end of said muffler with spacing;

both ends of a cylindrical elastic fitting are brought into close contact with the outer surfaces of open end portions of said outer cylinder for said expansion chamber and said muffler to connect said outer cylinder and said muffler;

cooling medium introduced from said outer cylinder is communicated with a space between said elastic fitting and said expansion chamber to be discharged into said muffler.

4. An engine exhaust system for a small watercraft as claimed in claim 3 wherein, in the open end of said outer cylinder, communication holes for cooling medium are opened only at the top side of said outer cylinder.

5. An engine exhaust system for a small watercraft as claimed in claim 3 wherein, the inside space of said muffler is divided by a weir wall into a chamber into which said expansion chamber is inserted and another chamber; and the height of said weir wall is adjusted equal to or higher than the top end elevation of said elastic fitting.

* * * * *